D. F. STAYMAN.
PISTON VALVE.
APPLICATION FILED APR. 17, 1912.
1,054,625.
Patented Feb. 25, 1913.
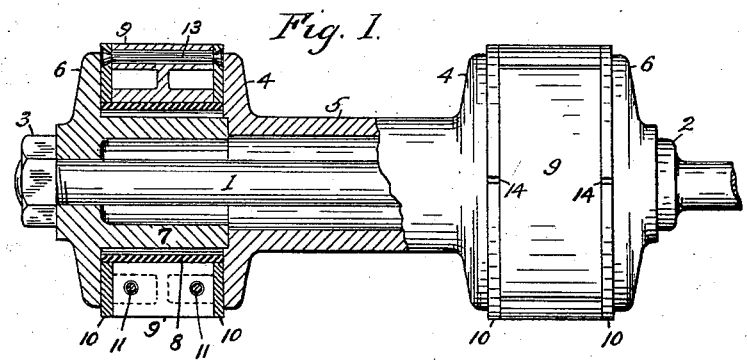
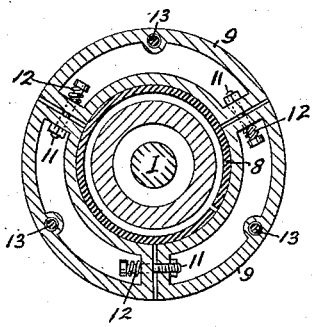
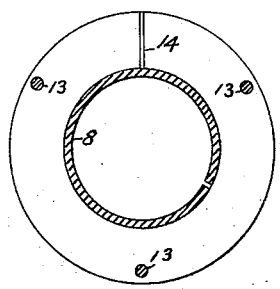
Witnesses:
Inventor
David F. Stayman.
By his Attorney

UNITED STATES PATENT OFFICE.

DAVID F. STAYMAN, OF PHILADELPHIA, PENNSYLVANIA.

PISTON-VALVE.

1,054,625.  Specification of Letters Patent.  Patented Feb. 25, 1913.

Application filed April 17, 1912. Serial No. 691,365.

*To all whom it may concern:*

Be it known that I, DAVID F. STAYMAN, a citizen of the United States, and resident of Philadelphia, in the county of Philadelphia and State of Pennsylvania, have invented certain new and useful Improvements in Piston-Valves, of which the following is a specification.

The invention relates to improvements in piston-valves or cylinder-pistons of the class described in the patent granted to me November 1, 1910; and the object of the same is to provide for said valve a self-adjusting piston or packing ring adapted to yieldingly engage the walls of the cylinder, and includes certain details of construction hereinafter set forth.

In describing the invention in detail reference is had to the accompanying drawings, forming a part of this specification, and wherein like characters of reference are used to designate like parts throughout the several views, and in which:

Figure 1 is a side view, partially in section, of a piston-valve embodying the present invention; Fig. 2, a transverse sectional view through one of the heads; and Fig. 3, a transverse sectional view of the central spring-ring, shown in connection with one of the binder-rings.

In the drawings, numeral 1 designates a central valve-stem, provided with a fixed collar 2, and a nut 3. Removably secured upon the stem by the nut and collar is the valve-body, comprising two pairs of circular head-flanges; the inner flange 4 of each head being connected together by the integral tubular member 5, and the outer flange 6 bearing upon the stem and provided with an annular sleeve 7, which engages a recess formed in the opposing flange for securing alinement of the parts. Between each pair of head-flanges 4 and 6 and in sliding engagement therewith is disposed a spring-ring 8, having free ends, and composed of suitably tempered material adapted to yieldingly and outwardly urge the sectional piston or packing ring 9 and the binder-rings 10. The piston-ring is preferably made in three sections or segments, which are yieldingly connected together by the bolts 11 and the bolt-encircling springs 12, the ring segments being suitably flanged to receive these parts and permit the bolt-springs 12 to inwardly urge or contract said segments in opposition to the outward action of the spring-ring 9, the relative action of the bolt-springs being adapted for adjustment by the bolts to provide a regulated degree of yielding pressure between the piston-ring and the walls of the surrounding cylinder. For covering the lateral joints of the piston-ring, the binder-rings 10 are slidingly connected thereto by the tie-rods 13, fixed in the binder-rings and extending loosely through perforations formed in the segments of the piston-ring to permit of relative movement for the self adjustment of the latter. A transverse slot 14, extending through each of the binder-rings, permits of the latter's contraction and expansion under the action of the spring-ring 8, which action likewise causes a corresponding movement of the segmental piston-ring to effect a self-adjusting tension between the latter and the walls of the cylinder.

While I have shown the piston-ring as being formed in three parts, it will be understood that the same may be divided into two or more segments, and it will also be evident that the binder-rings may each be made also in several segments and the parts so disposed with relation to the segments of the piston-ring as to cover the several lateral joints thereof for the prevention of the leakage of steam or other fluid introduced into the cylinder.

What I claim as my invention and desire to secure by Letters Patent, is:

1. A piston or packing ring comprising a plurality of annular segments, yielding connections normally contracting said segments, expansible binder-rings covering the lateral joints of said piston-ring, and means for connecting said binder-rings and piston-ring in movable relation with each other.

2. A piston or packing ring comprising a plurality of annular segments, adjustably yielding connections normally contracting said segments, expansible binder-rings covering the lateral joints of said piston-ring, and means for connecting said binder-rings and piston-ring in movable relation with each other.

3. A piston or packing ring comprising a plurality of annular segments, yielding connections normally contracting said segments, expansible binder-rings covering the lateral joints of said piston-ring, means for connecting said binder-rings and piston-ring in movable relation with each other, and a spring-ring expansibly engaging said binder-rings and piston-ring.

4. In a piston, the combination of a piston-head having spaced flanges, a piston-ring disposed between said flanges and comprising a plurality of annular segments, yielding connections normally contracting said segments, expansible binder-rings covering the lateral joints of said piston-ring, means for connecting said binder-rings and piston-ring in movable relation with each other, and a spring-ring disposed between said piston-head flanges and expansibly engaging said binder-rings and piston-ring.

5. In a piston, the combination of a piston-head having spaced flanges, a piston-ring disposed between said flanges and comprising a plurality of annular segments, adjustably yielding connections normally contracting said segments, expansible binder-rings covering the lateral joints of said piston-ring, means for connecting said binder-rings and piston-ring in movable relation with each other, and a spring-ring disposed between said piston-head flanges and expansibly engaging said binder-rings and piston-ring.

Signed at Philadelphia, in the county of Philadelphia and State of Pennsylvania, this 13 day of April, A. D. 1912.

DAVID F. STAYMAN.

Witnesses:
S. W. FOSTER,
CHAS. E. POTTS.

---

Copies of this patent may be obtained for five cents each, by addressing the "Commissioner of Patents, Washington, D. C."